Jan. 15, 1952 C. L. FREDERICK 2,582,939

RECORD CHIP REMOVAL APPARATUS

Filed April 15, 1947

INVENTOR.
CARL L. FREDERICK
BY
Blair, Curtis & Hayward
ATTORNEYS.

Patented Jan. 15, 1952 2,582,939

UNITED STATES PATENT OFFICE 2,582,939

RECORD CHIP REMOVAL APPARATUS

Carl L. Frederick, Snyder, N. Y., assignor to Dictaphone Corporation, New York, N. Y., a corporation of New York Application April 15, 1947, Serial No. 741,672

1 Claim. (Cl. 274—47)

Figure 1:
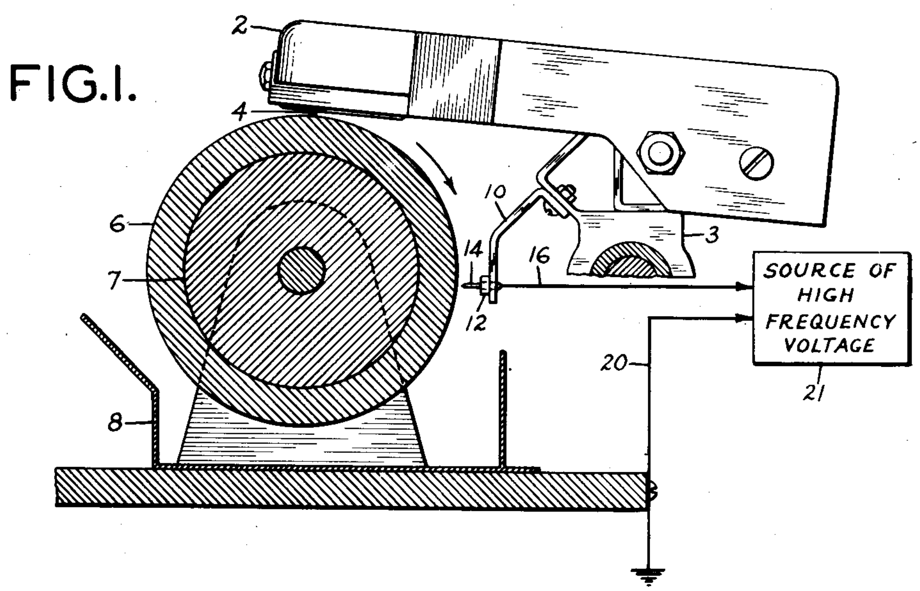

This invention relates to methods and apparatus for removing loose particles from the surface of sound records and more particularly to the removal of particles of record material cut from such records during the recording operation.

In most sound recording systems, the sound signals are recorded by cutting away small portions of the record surface to form a groove corresponding to the sound vibrations being recorded. Frequently, as a result of such an engraving operation, the particles of record material, usually in the form of chips or strings, cut from the record surface become electrostatically charged and cling tenaciously to the surface of the record. This is particularly troublesome in office-type dictating machines which use cylindrical records of wax-like material. These particles must be removed before the sound is reproduced or they will become imbedded in the engraved sound track and cause irregular movement of the reproducing stylus, thus increasing the "crackling" or background noise which accompanies reproduction of the recorded sound. Furthermore, when recording, the loose particles may cling to unrecorded portions of the record and interfere with the motion of the recording stylus as these portions are engraved, thus increasing the noise level of the record even though the loose particles are removed prior to reproduction. It is therefore desirable that the particles of record material be removed continuously from the surface of the record as the recording proceeds.

Several methods have been proposed for removing these particles but none have proven entirely satisfactory for use in dictating machines. For example, it has been porposed to sweep the particles from the surface of the record with a soft camel hair bush positioned near and moving longitudinally along the record with the cutting stylus. One disadvantage of such an arrangement is that the friction between such a brush and the surface of the record gives rise to an increased electrostatic charge on the particles, thus making many of the particles cling to the record more tenaciously than ever. In addition, if the brush is not cleaned frequently it becomes matted with particles of record material which not only interfere with its cleaning ability, but actually scratch the surface of the record. Such minute scratches increase the background noise on reproduction.

It has also been proposed to use a brush having bristles coated with a conducting material, such as a very thin layer of silver or graphite, to carry off the electrostatic charge from the particles which they contact. This arrangement is not effective because the conductive bristles are soon covered with an insulating layer of record material, and the fact that the record material is nonconductive does not permit the intimate contact required for the carrying away of the electric charge. The wax-like record material ordinarily used for recording dictation is relatively soft and thus is easily scratched by such conducting bristles, particularly if they have been metalized.

Another system proposes using an electrode charged to a very high static voltage to attract the particles as they are cut from the surface of the record. Not only must such an electrode be cleaned frequently because the unidirectional potential causes the chips to adhere to its surface, but the use of such high D. C. voltage might be dangerous or frightening to personnel operating the machine.

It has also been suggested that a pellet of radio-active material might be used to reduce the charge on the record particles, thus making them easier to remove from the record by a brush or other means. Such an arrangement is not practical because the surface of the radio-active material must be cleaned frequently or the radiation is so reduced as to be ineffective to neutralize the static charges. In addition, the use of radio-active materials is not commercially feasible at the present time because of economic considerations.

In accordance with the present invention, a practical, easily constructed, and mechanically simple apparatus is provided for removing the particles of record material simultaneously with the engraving or recording operation by the use of alternating current potentials.

Accordingly, it is an object of this invention to provide an improved method and apparatus for removing loose particles or chips from record surfaces.

It is another object of this invention to provide an improved system for sound recording in which the particles or chips cut from the record surface during the recording operation are automatically removed as the record is cut.

It is a further object to provide an improved recording system in which such particles are removed by neutralizing the electrostatic charge on the particles, or on the record adjacent the particles, by use of a high frequency alternating current potential and permit them to fall from the record surface.

The invention accordingly consists in the features of construction, combinations of elements, arrangements of parts, and methods of operation, as will be exemplified in the structures and sequences and series of steps to be hereinafter indicated and the scope of the application of which will be set forth in the following claim.

Figure 2:
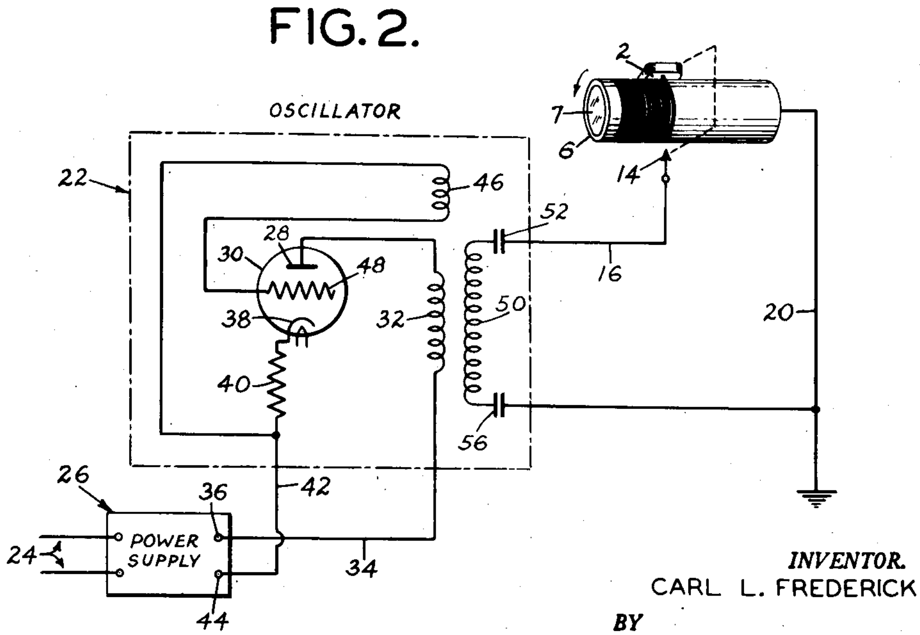

In the drawings:

Figure 1 shows an end view, partially in section, of a portion of an office dictating machine provided with a chip-removal arrangement in accordance with the present invention; and Figure 2 shows the wiring diagram of an oscillator suitable for providing a high frequency voltage for operation of the apparatus shown in Figure 1.

In the embodiment of the invention illustrated in Figure 1, a portion of an office dictating machine is shown provided with a sound recording head 2 suitably mounted on a carriage 3 and having a cutting stylus 4 positioned for recording on a cylindrical wax record 6 supported on a rotatable mandrel 7. The usual driving mechanism (not shown) is provided to rotate the mandrel and record in the direction indicated by the arrow and at the same time to feed the carriage 3, and thus the recording head 2, transversely along the cylindrical record for recording thereon. A tray 8 is provided immediately beneath the wax cylinder 6 for collecting the particles of record material cut from the record surface during the recording operation. An arm 10 extends downwardly from carriage 3 and supports at its lower end a block 12 of insulating material to which is affixed a metal electrode 14 extending horizontally from the insulating block 12 toward the wax record 6. The electrode 14 advantageously is sharply pointed and the point is placed as near the recording surface as practical design considerations will permit. Electrode 14 is connected by a lead 16 to a suitable source 21 of high-frequency voltage. Another lead 20 from the high-frequency voltage source is connected to the frame of the dictating machine. The frequency of the energy supplied to electrode 14 is not critical. Radio frequencies (and even high audio frequencies) have been found to give good results. However, the voltage necessary for effective removal of the chips increases with decreasing frequency and it is therefore desirable that a frequency of at least 100 or 200 kilocycles be used. If frequencies above 2 megacycles are employed, suitable shielding may be required to prevent radiation of the high-frequency energy. For these reasons, it is most convenient to employ a frequency between 200 kilocycles and 2 megacycles, and a 200 kilocycle signal has been found to produce entirely satisfactory results.

In operation, the chip-removal electrode 14, which is supported on the carriage 3, moves transversely along the record with the stylus 4. As the recording is made, electrical forces are produced which cause the particles of the record material to cling to the record surface. These electrical forces are neutralized by the high-frequency field near the tip of electrode 14 which is sharply pointed to facilitate the production of a corona discharge which ionizes the air and causes the charge on the particles to leak off. The particles, which were formerly charged with opposite polarity from that of the cylinder, are now electrically neutral and so are no longer attracted to the surface of the wax cylinder and thus fall immediately into tray 8. The high-frequency potential applied to electrode 14 is sufficiently high to cause complete removal of the chips from the record but is not high enough to cause bodily injury to a person accidentally coming in contact with the high-frequency electrode.

Figure 2 shows, schematically, a vacuum tube oscillator suitable for providing a high-frequency voltage for the chip-removal electrode 14. This oscillator, generally indicated at 22, utilizes a triode vacuum tube 30 to generate the high-frequency energy required. Power for operating the oscillator is provided from commercial power mains 24 through a power supply unit 26. The anode 28 of this tube is connected through a self-resonant plate coil 32 and a lead 34 to the positive terminal 36 of power supply 26; its cathode 38 is connected through a bias resistance 40 and a lead 42 to the negative terminal 44 of the power supply; and grid excitation is provided by a coil 46, which is connected between the control grid 48 and the lower end of bias resistance 40 and is inductively coupled to the plate coil 32. The chip-removal electrode 14 is connected to the upper end of a coil 50 coupled to coil 32, through the lead 16 and an isolating condenser 52; and the lower end of coil 50 is connected through a second isolating condenser 56 and lead 20 to the frame of the dictating machine. This is diagrammatically illustrated by the connection 20 to the mandrel 7.

From the foregoing, it will be observed that the sound recorder embodying the invention is well adapted to attain the ends and objects hereinbefore set forth and to be economically manufactured, since the separate features are well suited to common production methods and are subject to a variety of modifications as may be desirable in adapting the invention to different applications.

As many possible embodiments may be made of the above invention and as many changes might be made in the embodiment above set forth, it is to be understood that all matter hereinbefore set forth or shown in the accompanying drawings is to be interpreted as illustrative and not in a limited sense.

I claim:

In a recording apparatus wherein sound signals are engraved in a record surface by cutting away chips or strings of record material whereby said chips or strings cling to the surface of the record by electrostatic attraction, a chip removal system comprising, in combination, a record-supporting rotatable mandrel formed of electrically conducting material, means rotating said mandrel, a record having a cylindrical wax-like recording surface and supported by said mandrel, a recording element having a stylus for engraving sound signals on said surface, an arm mechanically linked to said recording element, a sharply pointed electrode near said record surface and supported by and positioned by said arm substantially in circumferential alignment with said stylus to follow along behind the stylus as the mandrel is rotated, said sharply-pointed electrode being electrically insulated from said arm, a mechanism for moving said stylus and said electrode in conjunction transversely along said record surface during the recording operation, and a radio frequency generator coupled to said electrode and to said mandrel said mandrel and said electrode forming the output terminals of said radio frequency generator to produce a high potential gradient radio-frequency field at the point of said electrode adjacent said recording surface whereby the electrostatic charges acquired during the recording operation are dissipated and the chips thereby prevented from clinging to the recording surface.

CARL L. FREDERICK.

REFERENCES CITED

The following references are of record in the file of this patent:

UNITED STATES PATENTS

| Number | Name | Date |
|---|---|---|
| 840,802 | Pickard | Jan. 8, 1907 |
| 904,248 | Chapman | Nov. 17, 1908 |
| 2,086,516 | Curtin | July 6, 1937 |
| 2,300,923 | Hornor | Nov. 3, 1942 |
| 2,303,321 | Bennett | Dec. 1, 1942 |
| 2,473,753 | Johnson | June 21, 1949 |